US007110602B2

(12) United States Patent
Krause

(10) Patent No.: US 7,110,602 B2
(45) Date of Patent: Sep. 19, 2006

(54) SYSTEM AND METHOD FOR DETECTION OF IMAGE EDGES USING A POLAR ALGORITHM PROCESS

(75) Inventor: Larry G. Krause, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 762 days.

(21) Appl. No.: 10/224,866

(22) Filed: Aug. 21, 2002

(65) Prior Publication Data

US 2004/0037465 A1 Feb. 26, 2004

(51) Int. Cl.
*G06K 9/48* (2006.01)
(52) U.S. Cl. .................................... 382/199; 203/266
(58) Field of Classification Search ................. 378/62, 378/117; 382/103, 176, 199, 261, 266, 203, 382/258

See application file for complete search history.

(56) References Cited

U.S. PATENT DOCUMENTS

| | | | |
|---|---|---|---|
| 3,972,043 A | | 7/1976 | Locus |
| 4,267,562 A | * | 5/1981 | Raimondi .................... 348/144 |
| 4,905,014 A | | 2/1990 | Gonzalez et al. |
| 4,910,786 A | * | 3/1990 | Eichel ......................... 382/199 |
| 5,335,298 A | | 8/1994 | Hevenor et al. |
| 5,485,502 A | * | 1/1996 | Hinton et al. ................. 378/117 |
| 5,651,512 A | * | 7/1997 | Sand et al. .................. 244/3.11 |
| 5,848,193 A | * | 12/1998 | Garcia ......................... 382/232 |
| 5,978,520 A | * | 11/1999 | Maruyama et al. ........... 382/294 |
| 6,072,889 A | * | 6/2000 | Deaett et al. ................. 382/103 |
| 6,078,680 A | * | 6/2000 | Yoshida et al. ............... 382/128 |
| 6,373,918 B1 | * | 4/2002 | Wiemker et al. ............... 378/62 |
| 6,445,832 B1 | * | 9/2002 | Lee et al. ...................... 382/266 |
| 6,614,944 B1 | * | 9/2003 | Levantovsky ............... 382/261 |
| 6,738,512 B1 | * | 5/2004 | Chen et al. ................. 382/176 |
| 6,848,087 B1 | * | 1/2005 | Sengupta et al. .............. 716/4 |
| 6,862,369 B1 | * | 3/2005 | Kondo ......................... 382/199 |
| 2004/0037465 A1 | * | 2/2004 | Krause ......................... 382/199 |

OTHER PUBLICATIONS

Lacroix V: "A Three-Module Strategy for Edge Detection" IEEE Transactions on Pattern Analysis and Machine Intelligence. IEEE Inc. New York US; vol. 10, No. 6, Published Nov. 1, 1988, pp. 803-810.

Miller, F.R. et al "Template Based Method of Edge Linking Using a Weighted Decision"; Intelligent Robots and Systems '93, IROS '93. Proceedings of the 1993 IEIEE/RSJ Int'l Conf on Yokohama, Japan Jul. 26-30, 1993, pp. 1808-1815.

Jung-Me Park et al "A New Gray Level Edge Thinning Method" Proceedings of the ISCA 13th Int'l Conf Computer Applications in Industry and Engineering. Proceedings of 13th Int'l Conf on Computer Applications in Industry and and Engineering (Caine-2000), Honolulu, HI, USA, Nov. 1-3, 2000, pp. 114-119.

* cited by examiner

*Primary Examiner*—Gregory Desire
(74) *Attorney, Agent, or Firm*—Thomas J. Finn; John E. Gunther; Karl A. Vick

(57) ABSTRACT

An edge detection system and method implement a recursive polar algorithm process to generate an edge image from an input image. The edge detection system may include a polar filter to recursively perform low-pass filtering along edge contours of a gradient pixel grid and generate a gradient image output. An edge thinner may be included to find gradient field peaks along a direction of gradient vectors of the gradient image output and generate thinned gradient pixels. An edge path segmenter may group the thinned gradient pixels into edge segments, and a segment classifier may determine whether the edge segments are edge paths or clutter. The edge detection system and method may improve automated image processing in medical diagnostics, reconnaissance, missile guidance, hazard or threat warning systems, security systems, access control systems (e.g., face recognition), navigation, geographic mapping, manufacturing quality inspection, robot vision, and search and rescue.

21 Claims, 16 Drawing Sheets

PERPENDICULAR TO THE EDGE

ALONG THE EDGE

GRADIENT FIELD

POLAR FILTER PASS 1 RESULT

POLAR FILTER PASS 2 RESULT

POLAR FILTER PASS 3 RESULT

A GRADIENT FIELD

EDGE THINNED RESULT

SQUARE CONTOUR

CIRCLE CONTOUR

EIGHT-NEIGHBOR
ADJACENCY CRITERIA

GRADIENT DIRECTIONAL
DIFFERENCE CRITERIA

GRADIENT POSITIONAL
CRITERIA

SYSTEM AND METHOD FOR DETECTION OF IMAGE EDGES USING A POLAR ALGORITHM PROCESS

U.S. GOVERNMENT RIGHTS

This invention was made with U.S. Government support under contract number N00019-95-C-0120, awarded by the Department of the Navy, Naval Air Systems Command. The U.S. Government has certain rights in this invention.

TECHNICAL FIELD

The present invention pertains to pattern recognition and analysis, and in particular to detection of edges in images, and in some embodiments to computer vision and target acquisition.

BACKGROUND

Locating features within an image is fundamental to computer vision applications. The edges (or outline) of objects within the image are frequently the most useful features since the edges typically provide object shape information. The shape information facilitates subsequent object acquisition or recognition processing. The rapid increase in microprocessor throughput capabilities in recent years has fueled proliferation of computer vision applications in many diverse fields. Examples include automated processing of images in medical diagnostics, reconnaissance, missile guidance, hazard or threat warning systems, security systems, access control systems (e.g. face recognition), navigation, geographic mapping, manufacturing quality inspection, robot vision, search and rescue, etc.

One problem with conventional image processing systems is that the methods employed for edge detection and generation of edge images are not very tolerant to noise. Another problem with convention image processing systems is that significant throughput time is required for improved noise tolerance. Another problem with convention edge detection systems is that conventional methods may not achieve optimal edge filtering along arbitrary paths.

Thus, there is a general need for an improved image processing system and method. Thus, there is also a need for improved systems and methods for edge detection and generation of edge images. There is also a need for an improved edge detection and edge image generation system and method that provides improved noise tolerance and lowers the cost of imaging equipment greatly improving the affordability of an image processing system. Thus, there is also a need for an improved edge detection and edge image generation system and method with improved noise tolerance without significant throughput increases. Thus there is also a need for an edge detection system that may automatically adjust to any edge orientation or shape rather than being constrained to a discrete set of straight edge orientations to help achieve optimal edge filtering along arbitrary paths.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In one embodiment, the present inventor provides an image processing system. In another embodiment, the present inventor provides an edge detection system and edge image generating system. In another embodiment, the present inventor provides a method of detecting image edges and generating edge images. In yet other embodiments, the present invention provides a target acquisition system.

In one embodiment, the present invention locates the edges within a digital image pixel array. An imaging system may accept a digital image pixel array as input, with each pixel value representing intensity information. The boundary between contrasting regions within the image forms an edge, generally outlining objects within the image. The imaging system may implement a polar algorithm that may locate the edges and may return a binary image with pixel values of one corresponding to the edges and all remaining pixels set to zero. In an alternate embodiment, the system and method of the present invention may provide a label image where pixels are assigned integer values such that edge segments are uniquely identified while all other pixels are set to zero. In these embodiments, an edge segment (or edge path) may be considered a contiguous group of edge pixels along the boundary of contrasting regions.

Figure 1:
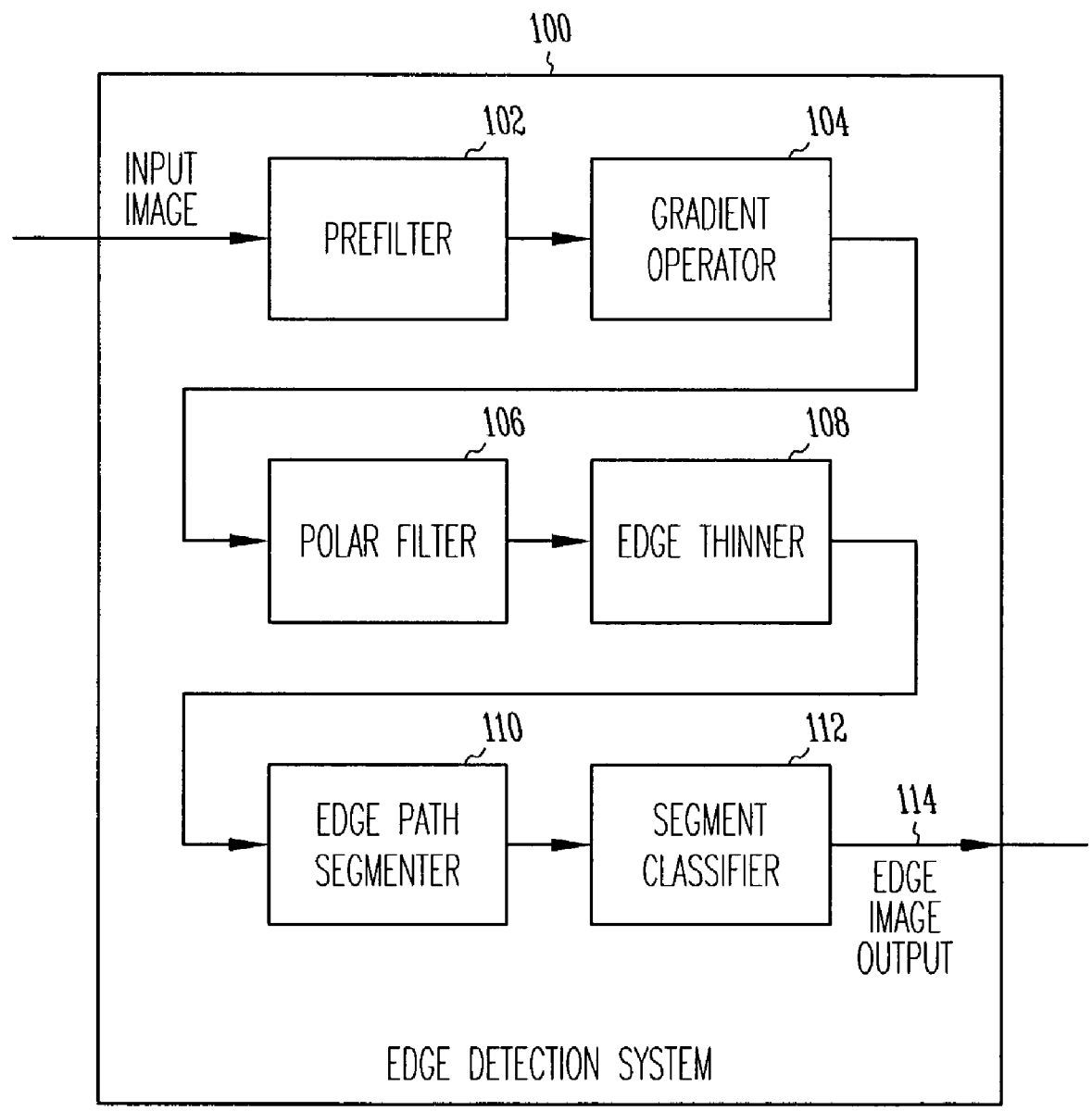
FIG. 1 is a simplified functional block diagram of an edge detection system in accordance with an embodiment of the present invention.

FIG. 1 is a simplified functional block diagram of an edge detection system in accordance with an embodiment of the present invention. Edge detection system 100 may be suitable for use for automated processing of images in an image processing system for medical diagnostics, reconnaissance, missile guidance, hazard or threat warning systems, security systems, access control systems (e.g., face recognition), navigation, geographic mapping, manufacturing quality inspection, robot vision, or search and rescue. Edge detection system 100 may include gradient operator 104 to generate a gradient pixel grid from an input pixel grid, and polar filter 104 to perform low-pass filtering along edge contours of the gradient pixel grid and generate a gradient image output. Edge detection system 100 may also include edge thinner 108 to find gradient field peaks along a direction of gradient vectors of the gradient image output and generate thinned gradient pixels. Edge detection system 100 may also include edge path segmenter 110 to group the thinned gradient pixels into edge segments, segment classifier 112 to determine whether the edge segments are edge paths or clutter and provide output edge image 114.

In one embodiment, edge detection system 100 may also include pre-filter 102 to suppress noise of an input image outside an imager bandwidth. In one embodiment, pre-filter 102 may be used to filter an input image. Pre-filter 102 may apply a point-spread function (PSF) to the input image and may have substantially the same spectral response as an imager that generated the input image.

In one embodiment, gradient operator 104 may generate each gradient pixel of the gradient pixel grid to be non-coincident with pixels of the input pixel grid. In one embodiment, gradient operator 104 may generate each gradient pixel of the gradient pixel grid to be a two-element gradient vector representing orthogonal components of the gradient pixel.

In one embodiment, polar filter 106 may perform filtering recursively (e.g., two or three times, or even more) until a signal-to-noise ratio (SNR) improvement of the gradient image output is below a predetermined level. To determine how much filtering is performed by polar filter 106, an equivalent shift variant linear spatial filter along an ideal noiseless edge may be computed to determine an upper bound on SNR improvement. In one embodiment, an amount of SNR improvement may be determined a priori (i.e. in advance), and then a polar filter neighborhood size and number of iterations may be chosen to achieve the amount of SNR improvement. The polar filter neighborhood size may, for example, be a number of neighboring pixels of the input image used to compute each output image gradient pixel. Given the filter size and number of iterations, polar filter 106 may be applied to an ideal noiseless edge to determine the filter's impulse response, from which an SNR improvement factor (discussed below) may be determined. The SNR improvement factor may represent an upper bound on the SNR improvement when the applied to a noisy image. The neighborhood size and number of iterations may be mathematically calculated or may be chosen by trial and error until the output is suitable for the application at hand.

In one embodiment, edge thinner 108 may retain a gradient pixel of the gradient image output when a magnitude of the gradient pixel is a local maximum along the direction of the gradient vectors. Edge thinner 108 may zero other gradient pixels. In one embodiment, edge thinner 108 may perform a non-maximal suppression.

Edge path segmenter 110 may group the thinned gradient pixels into edge segments, and in one embodiment, segment classifier 112 may determine whether the edge segments are edge paths or clutter, and may use, for example, a sum of squares of gradient magnitudes of the edge segment or the number of pixels within the edge segment squared. The operation of the various functional elements of system 100 is described in more detail below. In one embodiment, system 100 may also include an edge image generator element (not illustrated) to generate the edge image from the segments classified as edge paths. The edge image generator may follow segment classifier 112.

Although system 100 is illustrated as having several separate functional elements, one or more of the functional elements may be combined and may be implemented by combinations of software configured elements, such as processors including digital signal processors (DSPs), and/or other hardware elements. In one embodiment, a processor configured with software may implement system 100.

Figure 2:
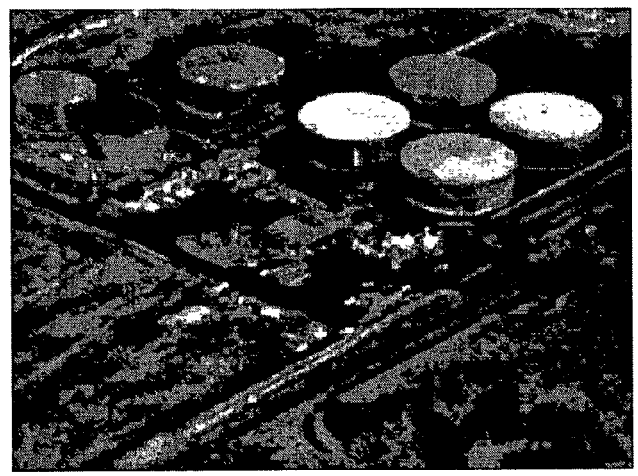
FIG. 2 is an infrared image example suitable for use with embodiments of the present invention.
Figure 3:
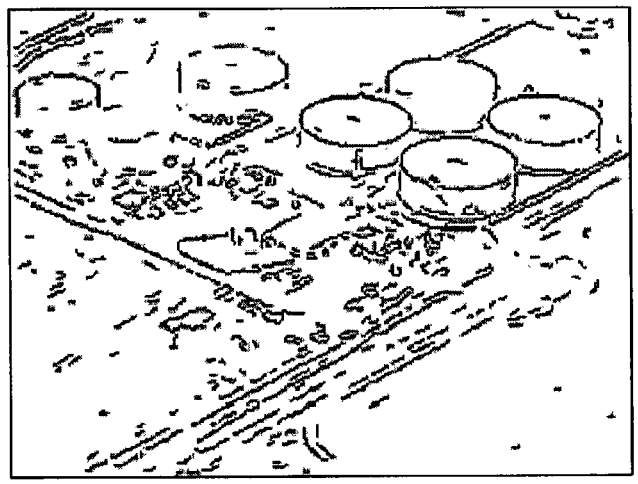
FIG. 3 is an outline of the example image of FIG. 2 generated in accordance with a conventional edge detection algorithm.
Figure 4:
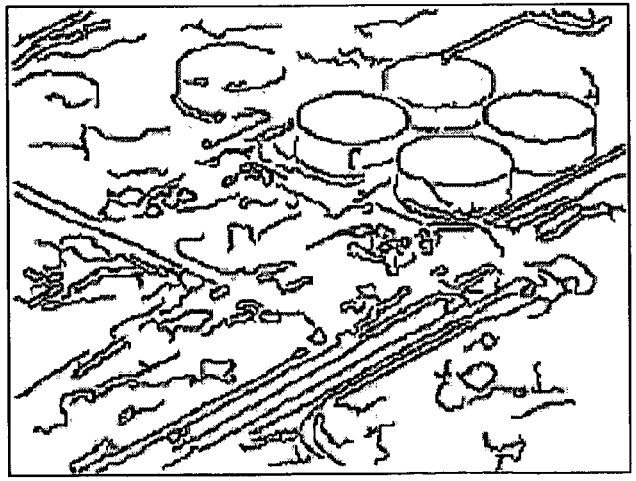
FIG. 4 is an outline of the example image of FIG. 2 generated in accordance with an embodiment of the present invention.

The polar algorithm process utilized in various embodiments of the present invention represents a fresh new approach to the edge detection problem and proved superior in noise immunity, edge connectivity, and clutter rejection when applied to imagery. FIG. 2 is an infrared image example suitable for use with embodiments of the present invention. The image of FIG. 2 is an infrared image captured during captive flight test of a guidance system. FIG. 3 shows an edge image resulting from the application of a conventional edge detection algorithm to the image of FIG. 2. FIG. 4 shows an edge image generated by applying the polar algorithm process of an embodiment of the present invention to the image of FIG. 2. The improved noise tolerance of the polar algorithm utilized in various embodiments of the present invention may allow lower cost imaging equipment greatly improving the affordability of such imaging systems. For example, lower cost infrared camera technology may be used in missile guidance systems, greatly improving the affordability of autonomously guided missiles.

Improved performance results from several unique characteristics that distinguish various embodiments of the present invention from conventional edge detection techniques. For example, the polar algorithm utilized in various embodiments of the present invention suppresses noise but preserves the edge signal by low pass filtering along edge contours. This facilitates detection of even very dim irregular edges. Conventional methods typically low-pass filter the entire image in two dimensions, which suppresses both edge signal and noise, prior to edge detection. Other attempts to filter along edges using oriented matched filters typically suffer great throughput cost and do not follow arbitrarily irregular curves. For example, the polar algorithm utilized in various embodiments of the present invention offers a linear trade between throughput and noise immunity as opposed to a size squared (or worse) trade using conventional practice. For example, the polar algorithm utilized in various embodiments of the present invention applies an edge filtering process that facilitates subsequent connectivity of pixels along edge paths to a much greater degree than conventional practice. This may help prevent gaps along the edge path. For example, the polar algorithm utilized in various embodiments of the present invention may automatically adjust edge detection thresholds, yielding good performance over an extremely wide range of image characteristics. In addition, the polar algorithm utilized in various embodiments of the present invention may achieve improved line detection performance while remaining well suited for real-time computer vision applications because of low computer throughput requirements.

Figure 5:
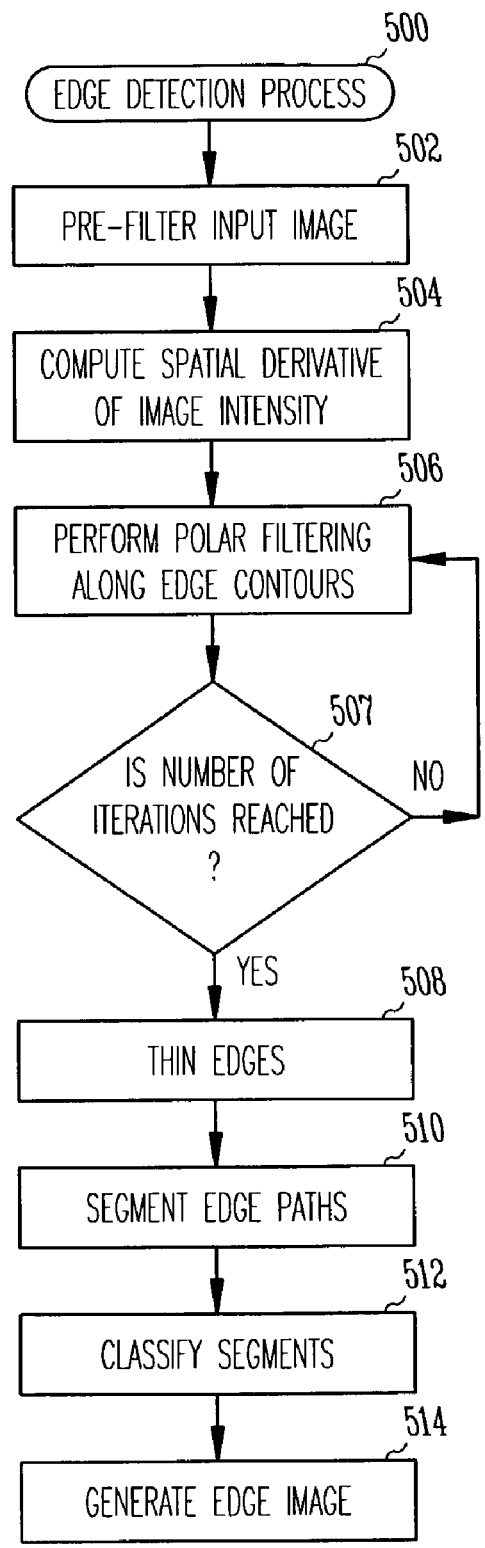
FIG. 5 is a flow chart of an edge detection process in accordance with an embodiment of the present invention.

FIG. 5 is a flow chart of an edge detection process in accordance with an embodiment of the present invention. Edge detection process 500 may be performed by edge detection system 100 (FIG. 1) although other systems may also be suitable. In operation 502 a pre-filtering operation may be used to suppress noise outside an imager passband. In operation 504, a gradient operator may compute a spatial diversity of image intensity and may differentiate the image in two dimensions. In operation 506, a polar filtering operation may suppress noise by filtering along the edge contours. Operation 507 determines if a number of iterations of the polar filtering performed in operation 506 have been performed. If the number of iterations of operation 506 has been reached, operation 508 is performed. The number of iterations may be predetermined. When the number of iterations of operation 506 has not been reached, operation 506 is performed. In one embodiment, to determine how much filtering is performed in operation 506, an equivalent shift variant linear spatial filter along an ideal noiseless edged may be computed to determine an upper bound on SNR improvement. This amount of SNR improvement may be determined a priori (i.e. in advance), and then a polar filter neighborhood size and number of iterations may be chosen to achieve that amount of SNR improvement.

In operation 508, an edge thinning operation may be performed to reduce the edge widths to a single pixel. In operation 510, edge pixels belonging to a common edge may be grouped. Operation 512 may classify edge segments to decide which edge segments are real edges as opposed to spurious edges due to noise and/or clutter. Operation 514 may generate an output image based on segments classified as real edges. The various operations of procedure 500 are discussed in greater detail below. Although the individual operations of procedure 500 are illustrated and described as separate operations, one or more of the individual operations may be performed concurrently and nothing requires that the operations be performed in the order illustrated.

In accordance with embodiments of the present invention, operation 502 may be performed by pre-filter 102 (FIG. 1), operation 504 may be performed by gradient operation 104 (FIG. 1), operations 506 and 507 may be performed by polar filter 106 (FIG. 1), operation 508 may be performed by edge thinner 108 (FIG. 1), operation 510 may be performed by edge path segmenter 110 (FIG. 1), and operations 512 and 514 may be performed by segment classifier 112.

In one embodiment, pre-filter 102 (FIG. 1) may process the imager output in an attempt to suppress noise while preserving the original signal input. A pre-filter having substantially the same spectral response as the imager (i.e. having the same MTF) may achieve an improved signal to noise performance. In cases where the signal-to-noise ratio improvement cannot be justified versus throughput cost, pre-filter 102 is optional or may be combined with gradient operator 104 (FIG. 1).

Many conventional gradient operators inherently achieve a degree of low pass filtering by averaging pixels together. Conventional edge detection schemes typically may do all image filtering prior to or combined with the gradient operator. Some conventional schemes may reduce the pre-filter bandwidth below the imager MTF bandwidth to further suppress noise at the expense of also suppressing signal. However, these conventional techniques do nothing to improve the signal-to-noise ratio, and low amplitude edges are often lost. Embodiments of the present invention may achieve a performance advantage through additional filtering after the gradient operation.

In accordance with an embodiment of the present invention, gradient operator 104 (FIG. 1) may determine the spatial derivative (e.g., a gradient) of the image intensity along two orthogonal directions. This may provide improved edge detection because edge detection schemes are interested in contours of maximum intensity slope. In one embodiment of the present invention, a minimized gradient operator extent is applied after an MTF matched pre-filter. In an alternate embodiment, equivalent performance may result when the pre-filter is convolved with each directional gradient operator and applied to the image as a single operation. Embodiments of the present invention may use any of the several gradient operators described in the literature, although other gradient operators may also be suitable.

Figure 6:
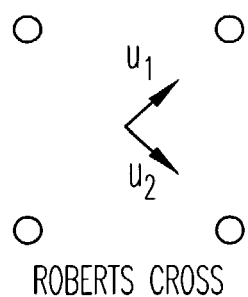
FIG. 6 illustrates various gradient operators suitable for use with embodiments of the present invention.
Figure 6:
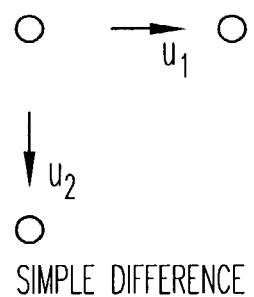

FIG. 6 shows a sampling of some conventional gradient operators suitable for use with embodiments of the present invention. Each pair represents a discrete approximation to the continuous domain derivative operator in each of two dimensions. However, many of the choices, including Sobel, Prewitt, and Roberts, attempt to combine some filtering along the edge in addition to applying the derivative without really knowing the edge orientation. Performance may be optimum when such filtering is minimized. Therefore, the better choices include the Roberts Cross or a simple difference operator. The Sobel operator may be used when the pre-filter is eliminated, or when the pre-filter bandwidth is increased to compensate for the additional low pass filtering inherent in the Sobel operator. Note that the Sobel operator is equivalent to the convolution of the Roberts operator with a 2×2 low pass filter with all weights equal to one.

Additional information on Roberts and Roberts Cross can be found in an article entitled "Machine Perception of Three Dimensional Solids, by L. G. Roberts, in *Optical and Electro-optical Information Processing*, pages 159–197, MIT Press, 1965. Additional information on Prewitt can be found in an article entitled "Object Enhancement and Extraction by J. M. S. Prewitt in *Picture processing and Psychopictorics*, Academic Press, 1970. Additional information on Sobel can be found in an article entitled "An Isotropic 3×3 Image Gradient Operator by I. Sobel in *Machine Vision for Three-Dimensional Scenes*, pages 376–379, Academic Press, 1990. Additional information on gradient operators may be found in "Handbook of Computer Vision Algorithms in Image Algebra", Second Edition, by Joseph N. Wilson and Gerhard X. Ritter, CRC Press. The input image for system 100 (FIG. 1) may be an N by M input image pixel array that may be represented as f(n,m) with $n \in \{0, 1, 2, \ldots, N-1\}$ serving as the horizontal index and $m \in \{0, 1, 2, \ldots, M-1\}$ serving as the vertical index. Then the vector-valued Roberts Cross gradient may be represented as:

$$g(n+0.5, m+0.5) = \begin{bmatrix} f(n+1, m) - f(n, m+1) \\ f(n+1, m+1) - f(n, m) \end{bmatrix}$$

Figure 7:
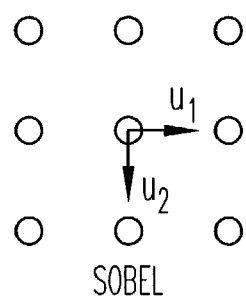
FIG. 7 illustrates various basis vectors and locations suitable for use with embodiments of the present invention.

In this case the gradient basis vectors $$u_1 = \begin{bmatrix} 1 \\ 0 \end{bmatrix} \text{ and } u_2 = \begin{bmatrix} 0 \\ 1 \end{bmatrix}$$

are oriented diagonally with respect to the image rows and columns as shown in FIG. 7. The index offsets of 0.5 serve to emphasize that the gradient pixel grid is not coincident with the original image pixel grid. Each gradient pixel may be located at the geometric center of the four pixels from which it was obtained. This is simply a convenient means to keep track of positions within the image for those applications where precise object positioning is important. A change in basis to align the gradient directions with the image axes may not be much benefit since such an operation effectively applies a low pass filter to the gradient result (i.e. the result may be equivalent to the Roberts operator result).

The vector-valued result for simple horizontal and vertical Simple Difference operators may be represented as:

$$g_x(n+0.5, m) = \begin{bmatrix} f(n+1, m) - f(n, m) \\ 0 \end{bmatrix}$$

$$g_y(n, m+0.5) = \begin{bmatrix} 0 \\ f(n, m) - f(n, m+1) \end{bmatrix}$$

In this case the gradient basis vector directions are horizontal and vertical, but their locations do not coincide with the pixel grid or each other (see FIG. 7). In general, odd size symmetric operators yield gradient values that coincide with the original pixel grid, while even size symmetric operators do not. Polar filter 106 may put non-coincident gradient components back on the original pixel grid, which allows either form to be used.

The two-element gradient vectors may also be represented as complex numbers with the real and imaginary parts representing orthogonal components of the gradient. In one embodiment, the present invention may use the simple difference for computing the gradients and may employ complex numbers to represent the gradients. Vector and complex representations may be used and may be equally valid.

Polar filter 106 (FIG. 1) accomplishes low pass filtering along edge contours. This element is referred to as a polar filter because the filter kernel may be amenable to expression in polar coordinates. Polar filter 106 accepts a gradient image input and produces a gradient image output. The input and output gradient images do not necessarily need to have coincident sampling grids. In fact, it is often desirable to use Polar filter 106 to restore the gradient sampling grid to coincidence with the original image. The gradient operators of Roberts, Roberts Cross, and Simple Difference are examples of gradient operators that do not yield output coincident with the original image-sampling grid. The polar filter may be used in a manner such that the polar filter output-sampling grid is coincident with the sampling grid of the image input to the Roberts, Roberts Cross, Simple Difference, or any other gradient operator.

Figure 8A:
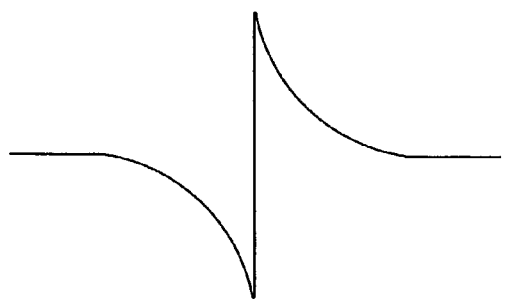
FIGS. 8A and 8B illustrate an equivalent polar filter impulse response in accordance with an embodiment of the present invention.
Figure 8B:
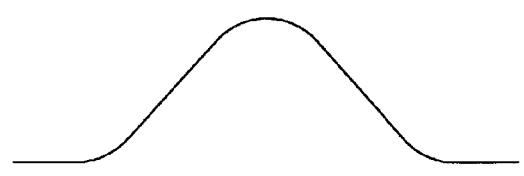

Polar filter 106 may be applied recursively, and in one embodiment, it may be applied as many times as necessary to yield a desired signal-to-noise ratio (SNR) output. Repeated application may increase the degree of filtering along the edge. Polar filter 106 may automatically adjust to the shape of the edge, even following around corners. For any given image, an equivalent linear shift-variant filter for each gradient direction may be constructed. In the absence of noise, the equivalent linear non-stationary filter may be a filter ideally matched to the edge as shown in FIGS. 8A and 8B.

Conventional edge detection algorithms may use linear filters applied prior to the gradient operation. Without knowing the edge orientation or being able to adapt to the edge shape, these conventional methods may not achieve optimal edge filtering along arbitrary paths. One conventional attempt often used to overcome this limitation is to apply an entire family of filters to the image, each with a different presumed edge orientation. Then the maximum of all the results is taken as the filter result. This approach suffers from its throughput requirements and is still constrained to the set of edge orientations and shapes (usually straight) modeled in the matched filters. Further, increasing the degree of filtering along the edge causes a squared increase in throughput requirements.

In accordance with embodiments of the present invention, polar filter 106 may automatically adjust to any edge orientation or shape rather than being constrained to a discrete set of straight edge orientations. The throughput requirements of polar filter 106 may increase only linearly with degree (i.e. filter length) of filtering along the edge. Polar filter 106 may compute each output gradient pixel value from a predefined neighborhood N of surrounding gradient pixels of the input image. The result of the $k^{th}$ application of polar filter 106 is the weighted sum of neighborhood gradients from the $(k-1)^{st}$ iteration, which may be represented as:

$$g_k(r) = \frac{1}{a} \sum_{s \in N} w(g_{k-1}(r+s), s) g_{k-1}(r+s)$$

Where: r is the vector valued filter position, s is the vector-valued position of a neighbor pixel relative to the filter position, $g_k(r)$ is the resulting gradient at position r within the output image, $g_{k-1}(r+s)$ is the gradient at position r+s within the input image, a is an optional scale factor correction, N is a set of offset vectors s defining the neighborhood, and w(g,s) is a weighting function.

The weighting may be a function of the angle between the neighbor pixel's gradient $g_{k-1}(r+s)$ and its relative position s. The weight may be always positive and may increase as the two vectors approach perpendicularity. One suitable weighting function may be represented as:

$$w(g,s) = \sin^2(\phi(g) - \phi(s))$$

Figure 9:
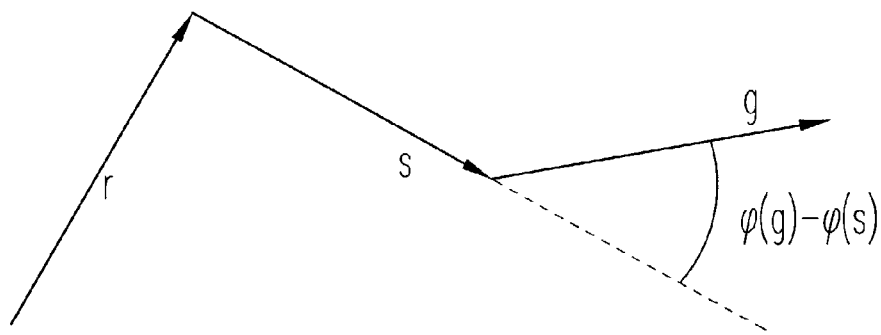
FIG. 9 illustrates phase angles of example gradient and position vectors in accordance with an embodiment of the present invention.

Where: $\phi(g)$ is the phase angle of the gradient vector g and $\phi(s)$ is the phase angle of the position vector s. For the special case where s has zero length the corresponding phase angle is undefined and the weight is set to a predefined constant value. A value of one (i.e. w(g,0)=1) may yield good performance. These example vectors are illustrated in FIG. 9.

An optional constant scale factor correction a may be used to preserve gradient magnitudes. Its value is determined by summing all the neighborhood weights assuming all the neighborhood vectors point in the same direction, which may be represented as:

$$a = w(g, 0) + \sum_{s \in N} \sin^2 \varphi(s)$$

The gradients and locations may be expressed as either vectors or as complex numbers. In either case the sine function does not need to be computed explicitly. For the vector case, the squared sine of the angle between the two vectors is the squared magnitude of the cross product of unit vectors in the gradient and relative position directions, and may be represented as:

$$\sin^2(\varphi(g) - \varphi(s)) = \left(\frac{|g \times s|}{|g||s|}\right)^2$$

For the complex number case, we can treat the horizontal direction as the real part and the vertical direction as the complex part. Then the sine square of the phase angle difference may be represented as:

$$\sin^2(\varphi(g) - \varphi(s)) = \left(\frac{\text{Im}(gs^*)}{|g||s|}\right)^2$$

Figure 10:
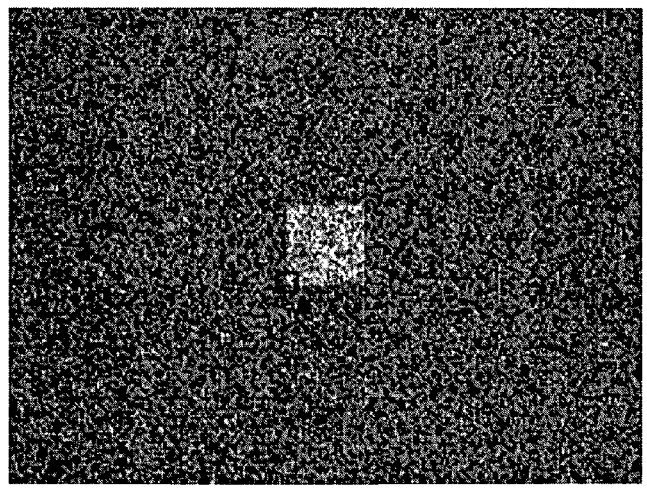
FIG. 10 illustrates an image with a low signal-to-noise ratio.
Figure 11:
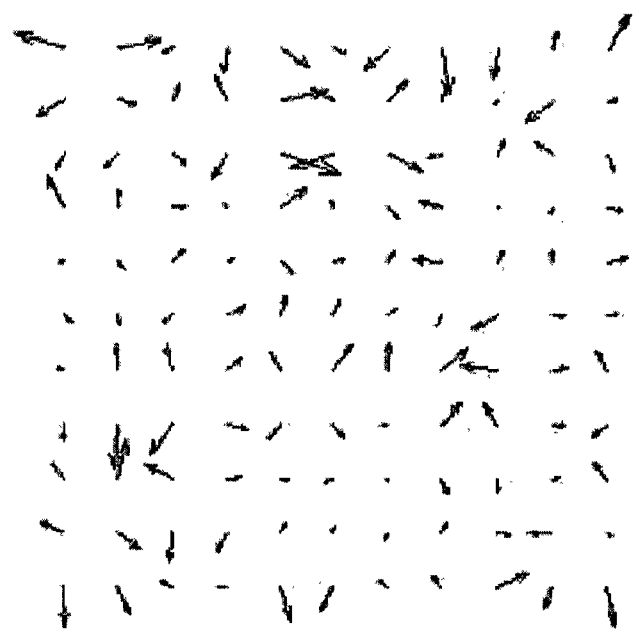
FIG. 11 illustrates a gradient field in accordance with an embodiment of the present invention.
Figure 12:
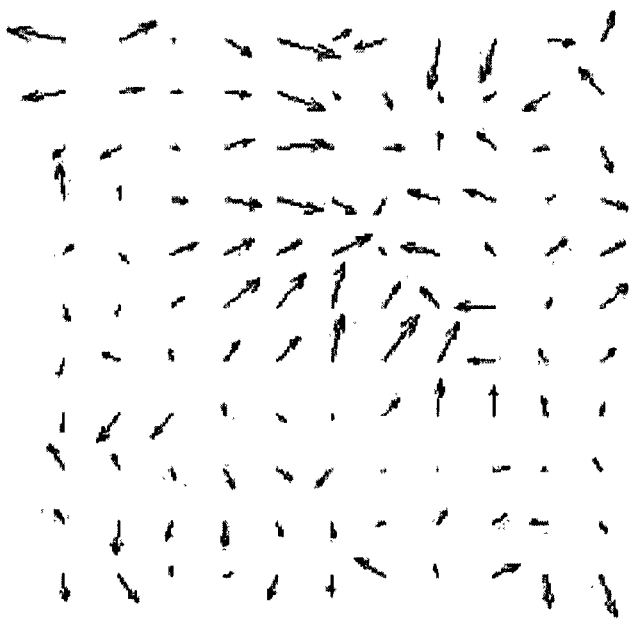
FIG. 12 illustrates the gradient field of FIG. 11 with one application of a polar filter in accordance with an embodiment of the present invention.
Figure 13:
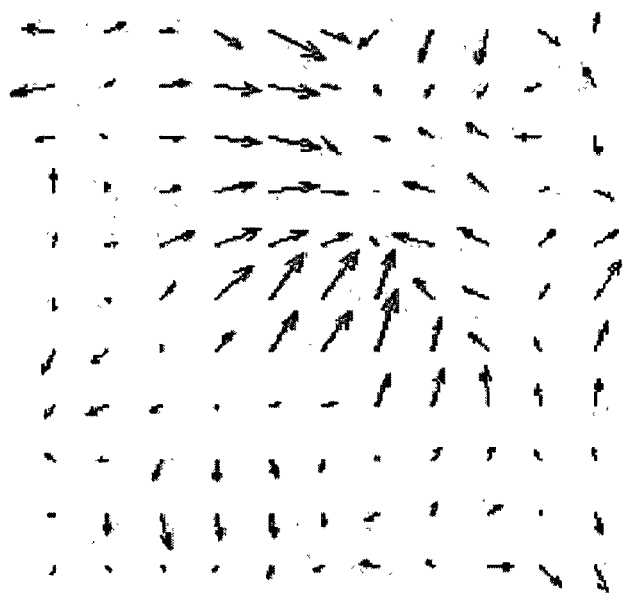
FIG. 13 illustrates the gradient field of FIG. 11 with two applications of a polar filter in accordance with an embodiment of the present invention.
Figure 14:
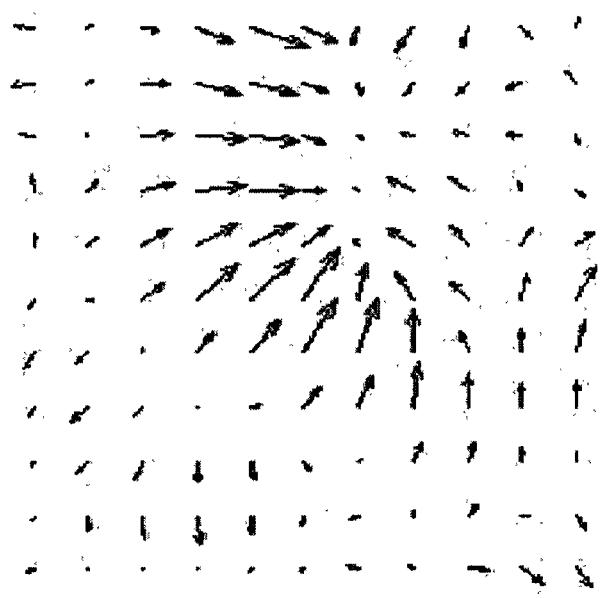
FIG. 14 illustrates the gradient field of FIG. 11 with three applications of a polar filter in accordance with an embodiment of the present invention.

Consider the noisy image (e.g., having low SNR) of a square target illustrated in FIG. 10. The black square outline (lower left corner of the target) is the area of this image to be used as an example for application of polar filter 106 (FIG. 1). FIG. 11 shows the gradient field generated from the outlined area of the image of FIG. 10. FIGS. 12 through 14 show examples of results of successively applying a 3×3 polar filter to the gradient field in accordance with embodiments of the present invention. Notice how the corner of the target becomes better defined each time polar filter 106 is applied.

In general, noise and image detail may decrease with filter size and with number of iterations. Three applications of a 3×3 polar filter may be suitable for many applications. Other applications may require reevaluation of filter size and iteration count based on desired signal-to-noise performance and preservation of detail. An upper bound on the signal-to-noise ratio improvement may be computed through computing the equivalent shift variant linear spatial filter along an ideal noiseless edge. The table below illustrates an effective signal-to-noise ratio improvement associated with several gradient filter and polar filter combinations.

| Gradient Filter | Number Polar filter Passes | w (g,0) | SNR Improvement |
| --- | --- | --- | --- |
| Simple Difference | 3 | 1 | 3.3593 |
| Simple Difference | 3 | 2 | 3.5382 |
| Sobel | 2 | 1 | 3.3127 |
| Sobel | 2 | 2 | 3.0607 |

Figure 15:
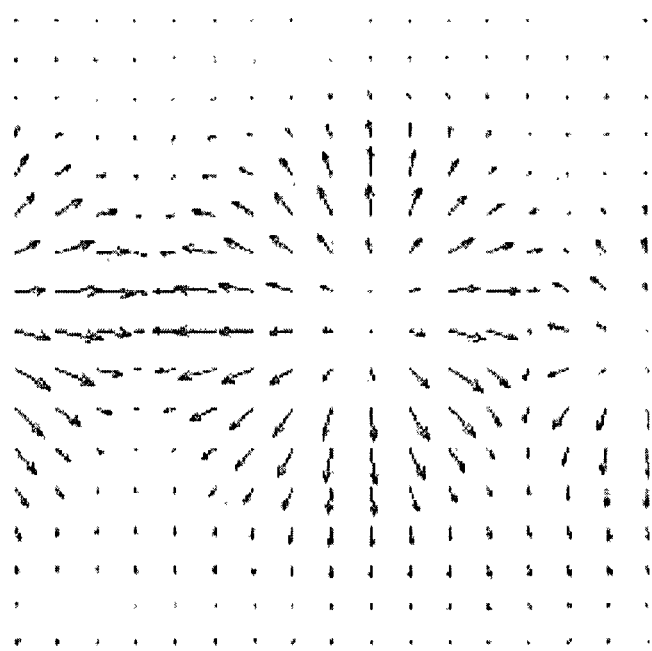
FIG. 15 illustrates the gradient field output of a polar filter in accordance with an embodiment of the present invention.
Figure 16:
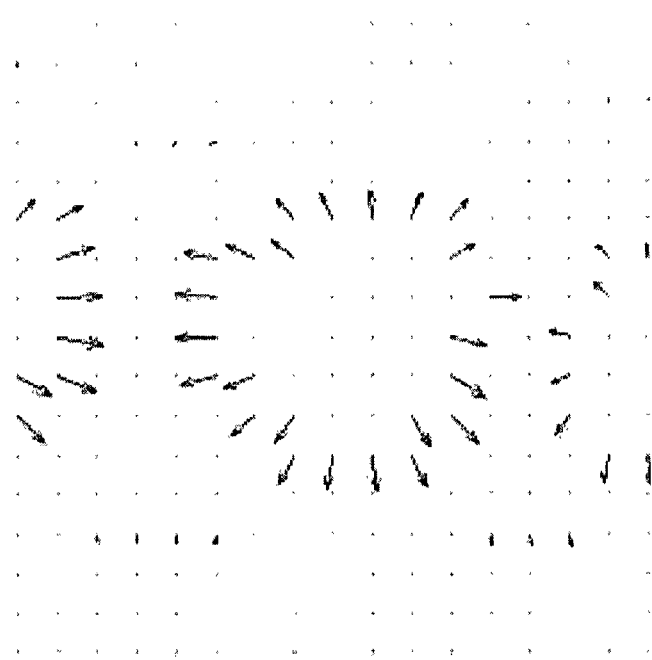
FIG. 16 illustrates an edge-thinned gradient field output in accordance with an embodiment of the present invention.

Edge thinner 108 (FIG. 1) performs an edge thinning process that may find the gradient field peaks along the direction of the gradient vectors in a manner similar to the Canny algorithm. However, Canny applies a threshold during this step that classifies each pixel as an edge or non-edge. In accordance with embodiments of the present invention, all peaks may be retained which may avoid making any premature decisions. This results in a rather dense field of edge ridges. FIG. 16 shows the result of applying edge thinning to the gradient field of FIG. 15. Additional information on edge detection by Canny can be found in an article entitled "A Computational Approach to Edge Detection" by J. Canny, *IEEE Transactions on Pattern Analysis and Machine Intelligence*, Vol. 8, No. 6, November 1986.

Figure 17A:
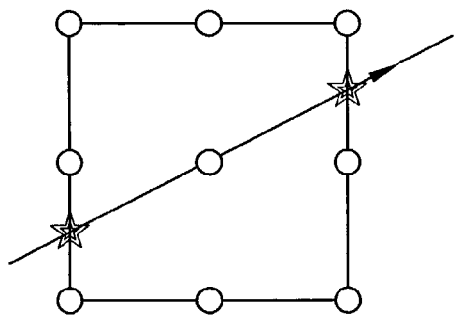
FIGS. 17A and 17B illustrate interpolation contours in accordance with an embodiment of the present invention.
Figure 17B:
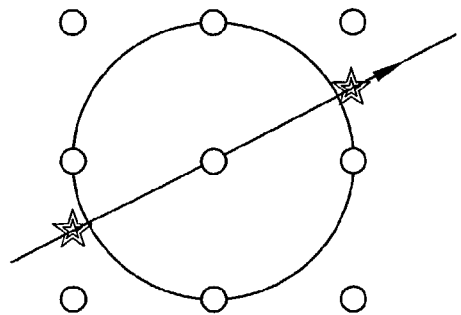

In accordance with an embodiment of the present invention, edge thinner 108 may retain a gradient pixel when its gradient magnitude is a local maximum along the direction of its gradient. Otherwise it may be zeroed. The gradient is a local maximum if the gradient magnitude equals or exceeds the interpolated gradient magnitudes at the intersection of a surrounding contour and a line along the gradient vector. Circle and square contour examples are illustrated in FIGS. 17A and 17B. The small circles may represent pixel center locations and the stars may represent interpolation points.

While either contour may be used, the square may provide better throughput. Use of the square contour may require two one-dimensional interpolations whereas use of the circle contour may require two two-dimensional interpolations in addition to the added complexity of finding the point of intersection. The two methods may yield results that are nearly indistinguishable. In accordance with embodiments of the present invention, unlike conventional applications of edge thinners, the original gradient information at the gradient ridge peaks are retained for subsequent processing.

Edge segmenter 110 (FIG. 1) may group individual thinned gradient pixels into edge segments. An edge segment may include all thinned edge gradient pixels that are determined to belong to a common edge feature within the image. The operation of edge segmenter 110 may prevent interruptions along edges, yielding cohesive edge paths. Most conventional edge detection schemes do not attempt to follow edge paths, stopping short of this. Instead, conventional edge detection schemes classify individual pixels as edge or noise based on a threshold that may be a possibly dynamic threshold. In other conventional edge detection schemes, edge path tracing is considered as a higher-level process in image understanding, taking place after edge detection is complete.

In accordance with embodiments of the present invention, two thinned edge gradient pixels may belong to the same edge segment when the two pixels are eight-neighbor adjacent, when their gradient directions are within, for example, 30 degrees of each other, and when each is located within, for example, 70 degrees of the other's gradient normal. Two thinned-edge pixel gradients meeting the above criteria may be termed siblings. The angle limits, of course, may be tuned to optimize performance for specific applications. Wider angles may increase connectivity. If the angles are made too wide, and then noise and/or clutter features may tend to attach themselves to legitimate edges. If the angles are made too narrow, the edge paths may become fragmented.

Figure 18A:
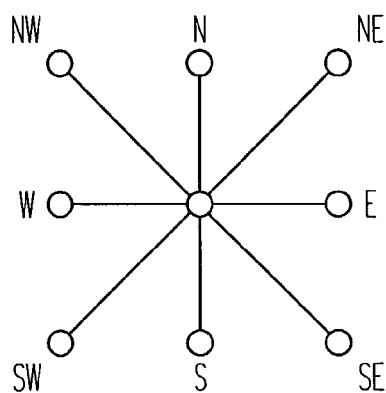
FIGS. 18A, 18B and 18C illustrate gradient pixel sibling criteria in accordance with an embodiment of the present invention.
Figure 18B:
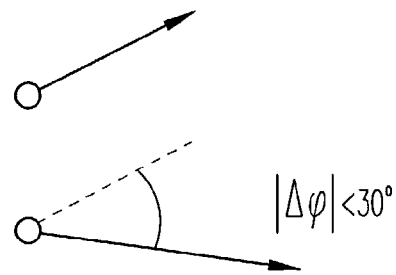
Figure 18C:
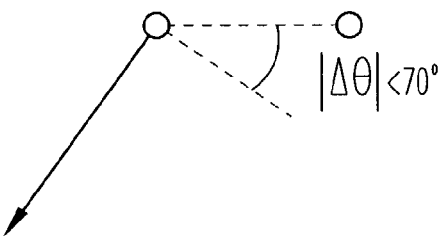

FIGS. 18A, 18B and 18C illustrate gradient pixel sibling criteria in accordance with an embodiment of the present invention. Edge path segmenter 110 (FIG. 1) may traverse the image in a scan line fashion, comparing each thinned gradient pixel to its southwest, south, southeast, and east neighbors. The other four neighbors may have already been compared to it since they were traversed earlier in the scan. Edge labels are assigned as the image is traversed. Each time a thinned edge pixel is encountered that is not a sibling of any previously traversed pixel, then a new label may be assigned. Otherwise, the pixel may inherit the label of a sibling. When a thinned edge pixel has two or more siblings with differing labels, one of the existing labels is arbitrarily picked for assignment and the labels are added to an equivalence list. Equivalent labels may belong to the same edge segment.

Figure 19:
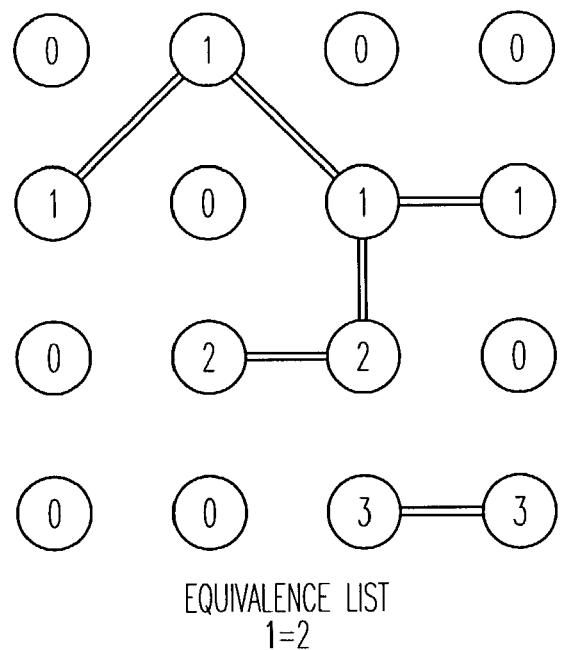
FIG. 19 illustrates labeling and identification of edge segment siblings in accordance with an embodiment of the present invention.
Figure 20:
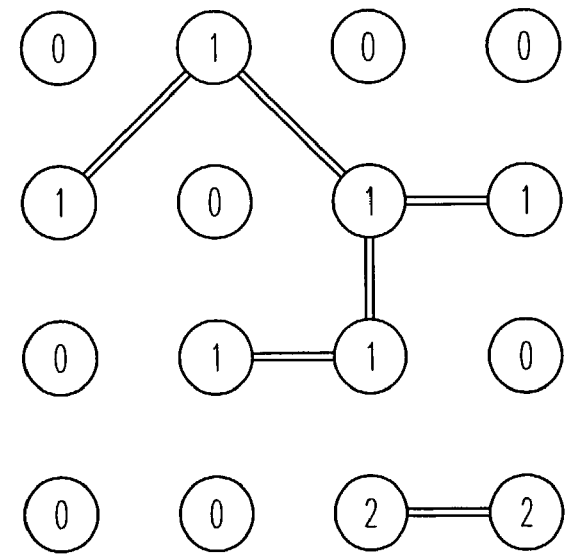
FIG. 20 illustrates the edge segment siblings of FIG. 19 after resolution of equivalences in accordance with an embodiment of the present invention.

FIG. 19 shows an example of the scan line traversal result. Each circle may represent a pixel. The number within the circle is the assigned label. Circles containing zero correspond to pixels rejected during the edge thinning process and are not edge segment pixels. The double lines between pixels represent cases where all three tests are satisfied, meaning the two pixels belong to the same edge segment. In this example, the scan was performed left to right, top to bottom. Pixels with labels 1 and 2 may belong to the same edge segment as is indicated in the equivalence list. Next, the equivalences are resolved and the edge pixels are relabeled. FIG. 20 shows the result corresponding to the example of FIG. 19.

Figure 21:
FIG. 21 is an example infrared image of an airport suitable for use with embodiments of the present invention.
Figure 22:
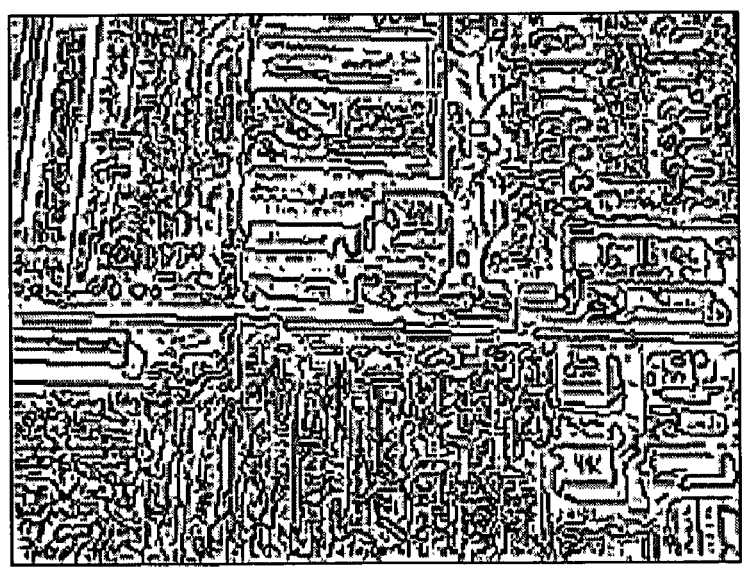
FIG. 22 illustrate edge segments of the image of FIG. 21 including edge paths and clutter in accordance with an embodiment of the present invention.
Figure 23A:
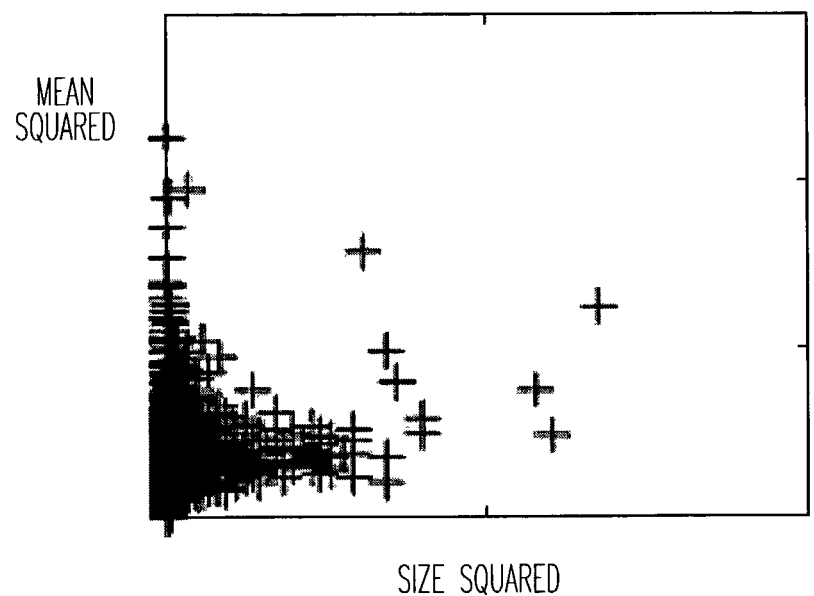
FIGS. 23A and 23B are scatter plots of corresponding feature values of the image of FIG. 21 in accordance with an embodiment of the present invention.
Figure 23B:
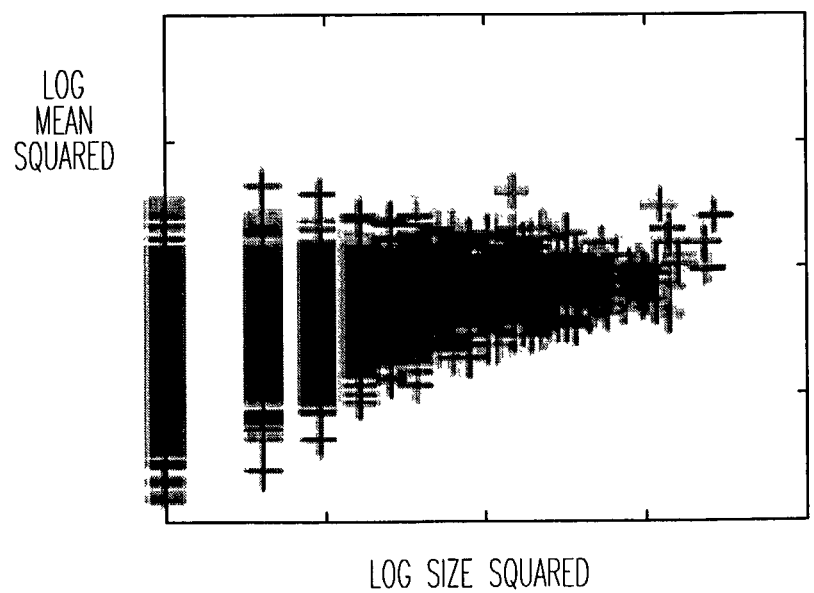

Segment classifier 112 (FIG. 1) may be used as a final step that classifies each edge segment as edge path or clutter. Classification may be based upon two features (or characteristics), which may include a mean-square gradient magnitude feature, and size squared feature. The mean-square gradient magnitude feature may be the sum of squares of gradient magnitudes within the edge segment. The size-squared feature may be the number of pixels within the edge segment squared. These two features may form a two-dimensional feature space. As an example, consider the image of FIG. 21 and the corresponding edge segments illustrated in FIG. 22. FIGS. 23A AND 23B show a scatter plot of the corresponding feature values. Unfortunately, the scatter plots of FIGS. 23A AND 23B show no distinct clustering of edge paths and clutter. Such clustering is generally required for conventional pattern classification schemes, and the absence of clustering is common for many images. Another problem is that the system often lacks a priori knowledge of edge path probability, and, in general, the number of edge paths in an image is unknown.

Figure 24:
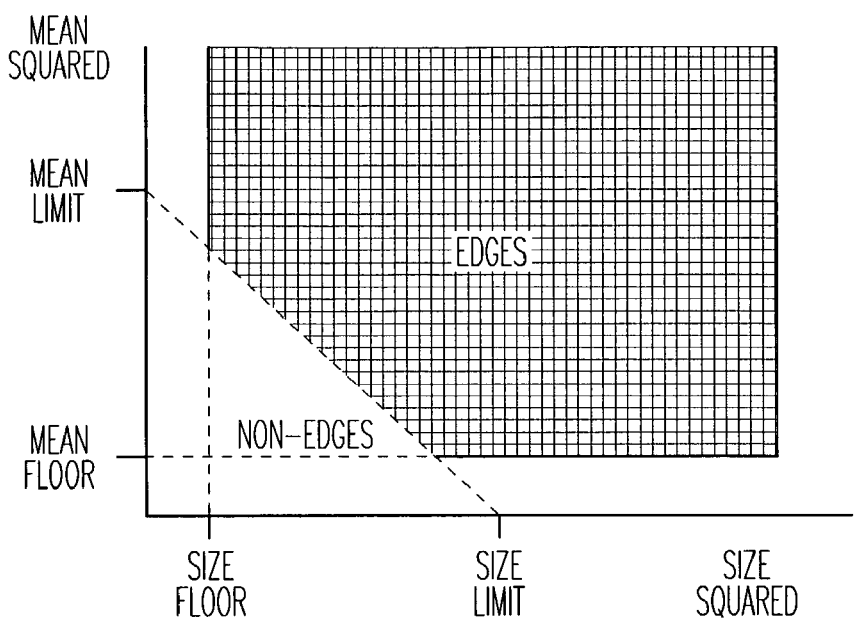
FIG. 24 illustrates feature space classification in accordance with an embodiment of the present invention.

FIG. 24 illustrates feature space classification in accordance with an embodiment of the present invention. The feature space may be divided into edge and non-edge regions. To be classified as an edge path, the edge segment size should exceed the size floor and its mean square gradient magnitude should exceed the mean floor. Further, the edge segment feature point should lie beyond a line defined by the mean limit and size limit axis intercepts. Accordingly, variables representing, size floor, mean floor, mean limit, and size limit may be determined.

Figure 25:
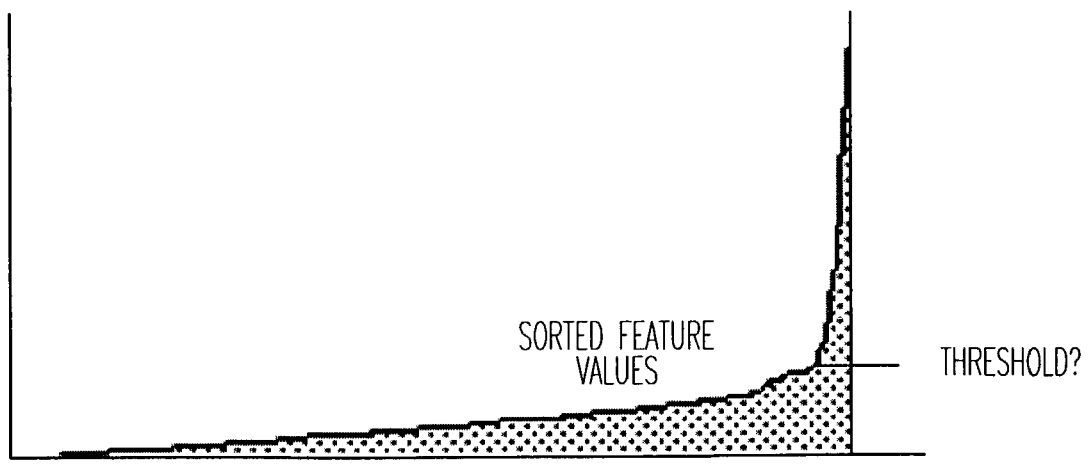
FIG. 25 illustrates an example method for choosing a threshold for edges in accordance with an embodiment of the present invention.
Figure 26:
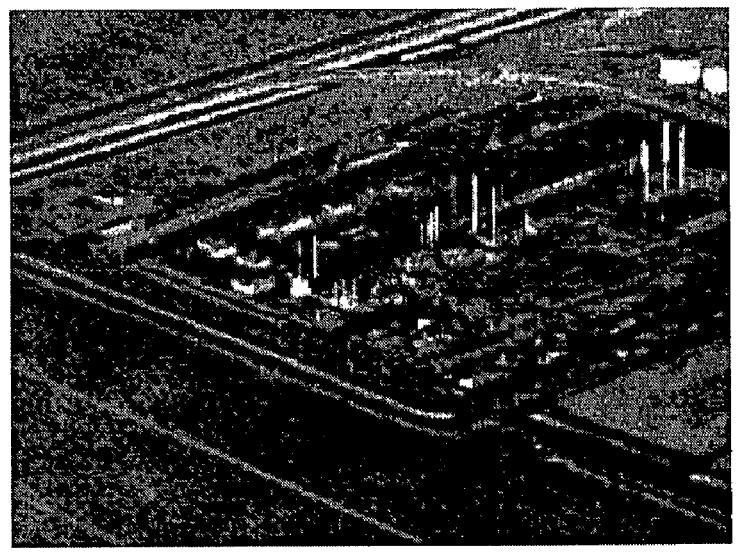
FIG. 26 is an infrared example of a refinery suitable for use with embodiments of the present invention.
Figure 27:
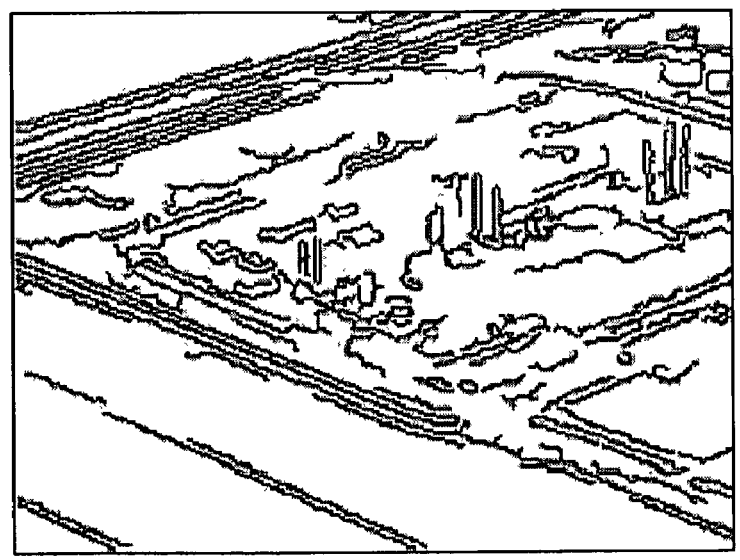
FIG. 27 illustrates classified edges of the image of FIG. 26 in accordance with an embodiment of the present invention.
Figure 28:
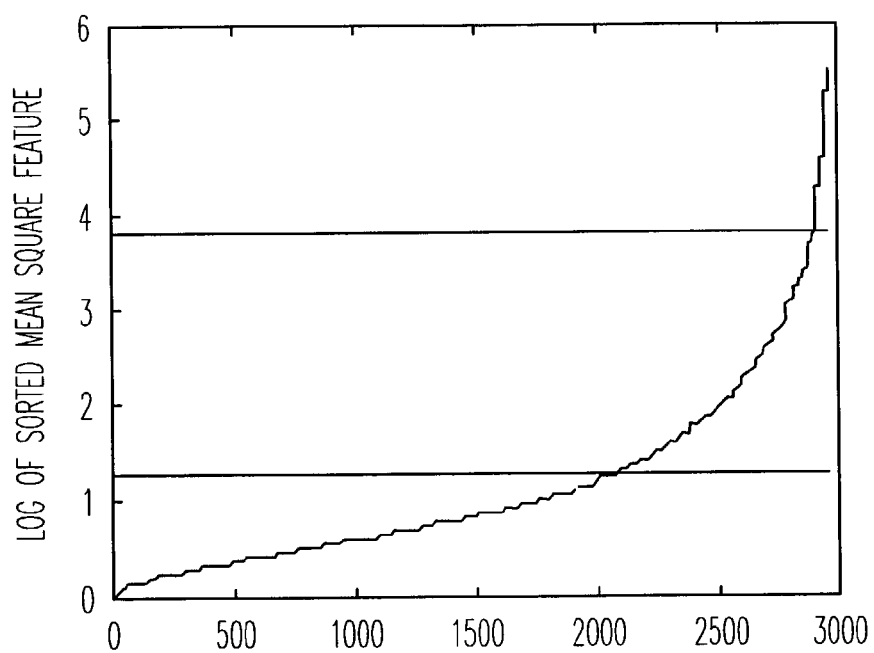
FIG. 28 illustrates example mean-square thresholds for establishing a classification boundary suitable for use with embodiments of the present invention.
Figure 29:
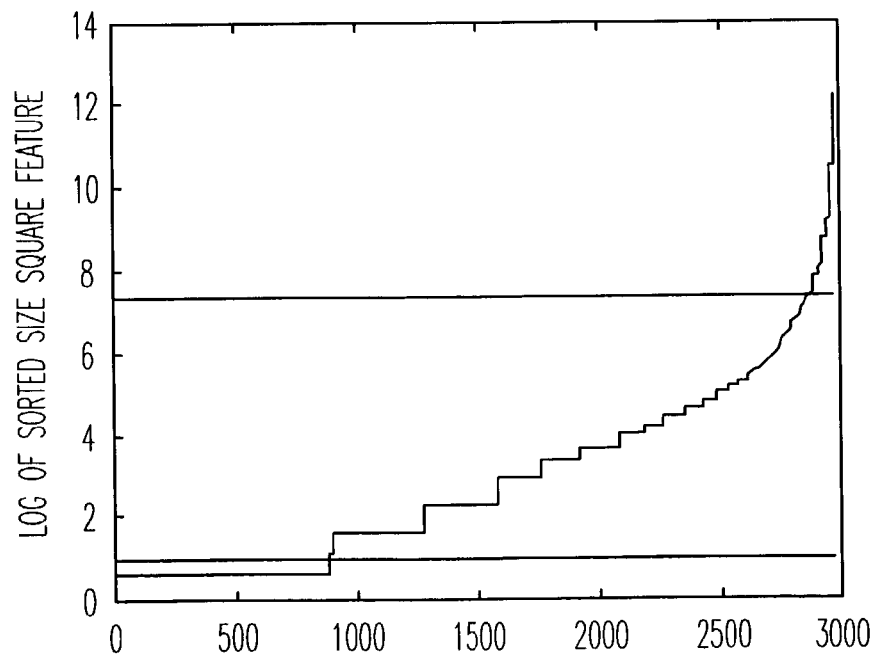
FIG. 29 illustrates example size-square thresholds for establishing a classification boundary suitable for use with embodiments of the present invention.
Figure 30:
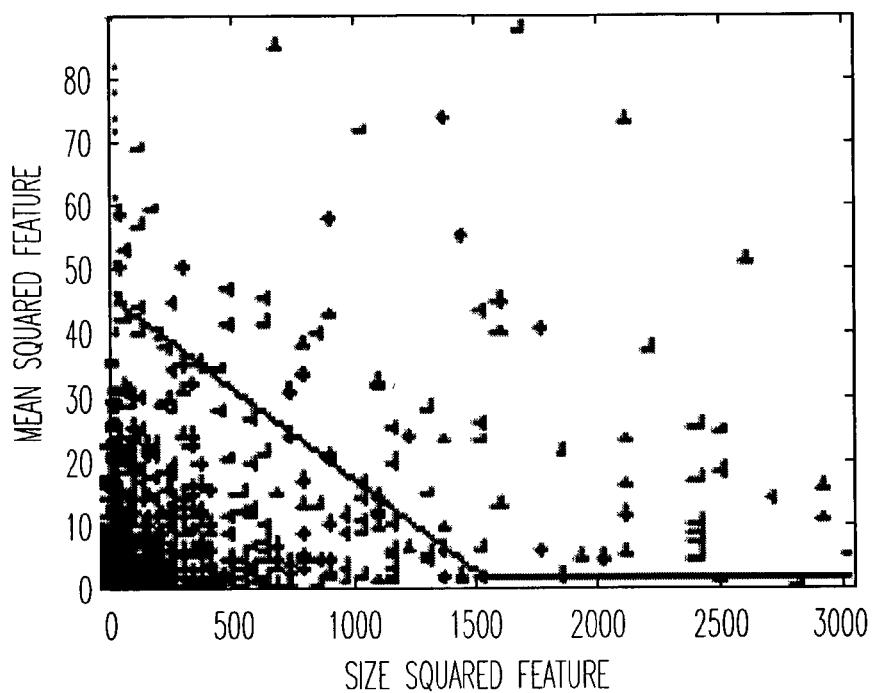
FIG. 30 illustrates an example of feature-space edge classification in accordance with an embodiment of the present invention.

FIG. 25 illustrates a cumulative histogram curve for the mean square magnitude feature. This is a plot of the number of edge segments with mean square magnitude less than x versus x. Alternatively, we can swap the plot axes as shown in FIG. 25. This plot may be interpreted as a plot of feature scores sorted by value. The curve of FIG. 25, although a hypothetical example, has shape typical of real imagery. The knee of the curve may be chosen for a feature value threshold. The knee may move up or down along the curve depending on axis scaling. This is indicative of exponential character. In such cases, taking the logarithm of the feature scores removes the scale factor dependence. For example, consider the following expression:

$$g(n)=af(n)$$

Here, a represents the axis scale factor and f(n) is the sorted feature value function. Upon taking the logarithm, the axis scale factor becomes an offset and no longer influences the knee location.

$$g(n)=loga+logf(n)$$

However, this result approaches minus infinity as f(n) approaches zero. This result may be avoided by adding one to the feature values. This also eliminates a second knee in the curve.

$$g(n)=loga(f(n)+1)=loga+log(f(n)+1)$$

In accordance with one embodiment, segment classifier 112 (FIG. 1) may choose two predetermined slope points on the logarithmic feature curve as the floor and limit thresholds. A curve with monotonically increasing slope will yield unique thresholds. However, in practice there are often multiple points on the curve having the floor and/or limit slopes. Segment classifier 112 may perform a binary search for the matching slope point and may keep the first one it finds. This may cause some frame-to-frame variability in thresholds, in turn, causing edge image variability within an image sequence. This issue may be at least partially resolved by applying a recursive alpha filter to the thresholds for an image sequence in an attempt to improve frame-to-frame uniformity. The binary search and filtering strategy may be chosen for certain applications because of their low throughput requirements and adequate edge classification performance.

The floor and limit thresholds may be chosen independently for the size squared and mean squared features. Then these thresholds may be used to establish the classification boundary in two-dimensional feature space as shown in FIG. 24. FIGS. 26 through 30 illustrate the classification process for a specific image example.

Figure 31:
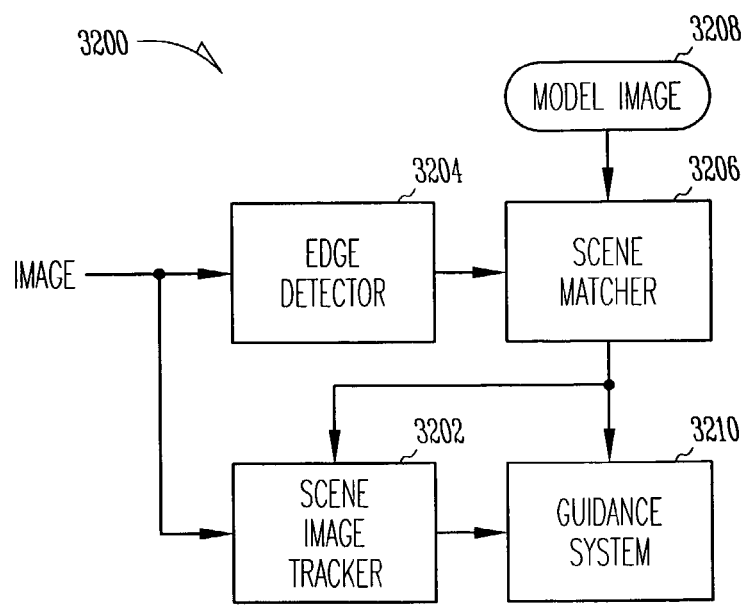
FIG. 31 is a simplified functional block diagram of a target acquisition system in accordance with an embodiment of the present invention.

FIG. 31 is a simplified functional block diagram of a target acquisition system in accordance with an embodiment of the present invention. Target acquisition system 3200 may include scene image tracker 3202 coupled with a navigation system to maintain a target aim point within an aim point position, edge detector 3204 to process a real-time target image to form an edge image, and memory 3208 to store a model image, which may have the target aim point. Target acquisition system 3200 may also include scene matcher 3206 to match the edge image with the model image to locate the target aim point within the edge image. Accordingly, guidance system 3210 may be directed to the target aim point. In accordance with one embodiment of target acquisition system 3200, edge detection system 100 (FIG. 1) may be suitable for use as edge detector 3204, although other edge detectors may also be suitable for use in system 3200.

In this embodiment, the system and method of the present invention may be used to guide a missile to the target vicinity. A terminal guidance infrared imaging seeker may be used to provide precision terminal guidance to impact. The seeker may use an autonomous target acquisition (ATA) algorithm to match the scene to a scene model representation and precisely locate the target aim point. A scene image tracker algorithm may be used to maintain an aim point position until just before impact. The ATA algorithm may use the polar algorithm of an embodiment of the present invention to form an edge image, which may then be matched to a scene template constructed from the scene model. The scene model may be constructed during mission planning from reconnaissance imagery.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. An edge detection system comprising:
   a gradient operator to generate a gradient pixel grid from an input pixel grid, wherein the gradient operator generates each gradient pixel of the gradient pixel grid to be non-coincident with pixels of the input pixel grid;
   a polar filter to perform low-pass filtering along edge contours of the gradient pixel grid and generate a gradient image output;
   an edge thinner to find gradient field peaks along a direction of gradient vectors of the gradient image output and generate thinned gradient pixels;
   an edge path segmenter to group the thinned gradient pixels into edge segments; and
   a segment classifier to determine whether the edge segments are edge paths or clutter.

2. The system of claim 1, wherein the gradient operator generates each gradient pixel of the gradient pixel grid to be a two-element gradient vector representing orthogonal components of the gradient pixel.

3. The system of claim 1 further comprising a pre-filter to suppress noise of an input image outside an imager bandwidth, the input image comprising the input pixel grid.

4. The system of claim 3 wherein the pre-filter applies a point-spread function (PSF) to the input image, the pre-filter having substantially the same spectral response as an imager that generated the input image.

5. The system of claim 1 wherein the polar filter restores a gradient sampling grid to coincide with pixels of the input image.

6. The system of claim 1 wherein the polar filter performs the filtering recursively until a signal-to-noise ratio (SNR) improvement of the gradient image output is below a predetermined level.

7. The system of claim 1 wherein a number of iterations of filtering by the polar filter is pre-computed based on an equivalent shift variant linear spatial filter along an ideal noiseless edged to determine an upper bound on SNR improvement.

8. The system of claim 1 wherein the edge thinner retains a gradient pixel of the gradient image output when a magnitude of the gradient pixel is a local maximum along the direction of the gradient vectors, the edge thinner zeroing other gradient pixels.

9. The system of claim 1 wherein the segment classifier determines whether the edge segments are edge paths or clutter using gradient magnitudes of the edge segment and the number of pixels within the edge segment.

10. A method of generating an edge image comprising;
    generating a gradient pixel from an input grid, wherein the gradient operator generates each gradient pixel of the gradient pixel grid to be non-coincident with pixels of the input pixel grid;
    performing low-pass filtering along edge contours of the gradient pixel grid to generate a gradient image output;
    finding gradient field peaks along a direction of gradient vectors of the gradient image output to generate thinned gradient pixels;
    grouping the thinned gradient pixels into edge segments; and
    determining whether the edge segments are edge paths or clutter to generate the edge image.

11. The method of claim 10 wherein a number of iterations of low pass filtering is pre-computed based on an equivalent shift variant linear spatial filter along an ideal noiseless edge to determine an upper bound on SNR improvement.

12. The method of claim 11 further comprising suppressing noise of an input image outside an imager bandwidth, wherein the input image comprises the input pixel grid,
    wherein suppressing noise comprises applying a point-spread function (PSF) to the input image, the pre-filter having substantially the same spectral response as an imager that generated the input image.

13. The method of claim 12 further comprising:
    retaining a gradient pixel of the gradient image output when a magnitude of the gradient pixel is a local maximum along the direction of the gradient vectors, the edge thinner zeroing other gradient pixels; and
    determining whether the edge segments are edge paths or clutter using gradient magnitudes of the edge segment and the number of pixels within the edge segment squared.

14. A target acquisition system comprising:
    a memory to store a model image, the model image having a target aim point;
    an edge detector to process a real-time target image to form an edge image;
    a scene matcher to match the edge image with the model image to locate the target aim point within the edge image; and a scene image tracker coupled to a missile/seeker navigation system to maintain the target aim point within an aim point position, wherein the edge detector comprises:

a polar filter to perform low-pass filtering along edge contours of a gradient pixel grid and generate a gradient image output;

an edge thinner to find gradient field peaks along a direction of gradient vectors of the gradient image output and generate thinned gradient pixels;

an edge path segmenter to group the thinned gradient pixels into edge segments; and a segment classifier to determine whether the edge segments are edge paths or clutter.

15. The system of claim 14 wherein the edge detector further comprises a gradient operator to generate a gradient pixel grid from an input pixel grid.

16. The system of claim 15 where in the polar filter restores a gradient sampling grid to coincide with pixels of the input image.

17. The system of claim 16 wherein a number of iterations of filtering by the polar filter is pre-computed based on an equivalent shift variant linear spatial filter along an ideal noiseless edged to determine an upper bound on SNR improvement.

18. The system of claim 17 wherein the edge thinner retains a gradient pixel of the gradient image output when a magnitude of the gradient pixel is a local maximum along the direction of the gradient vectors, the edge thinner zeroing other gradient pixels.

19. The system of claim 18 wherein the segment classifier determines whether the edge segments are edge paths or clutter using gradient magnitudes of the edge segment and the number of pixels within the edge segment squared.

20. An edge detection system comprising:

a polar filter to perform low-pass filtering along edge contours of a gradient pixel grid and generate a gradient image output;

an edge thinner to find gradient field peaks along a direction of gradient vectors of the gradient image output and generate thinned gradient pixels;

an edge path segmenter to group the thinned gradient pixels into edge segments; and a segment classifier to determine whether the edge segments are edge paths or clutter, wherein a number of iterations of filtering by the polar filter is pre-computed based on an equivalent shift variant linear spatial filter along an ideal noiseless edged to determine an upper bound on SNR improvement.

21. A method of generating an edge image comprising;

generating a gradient pixel grid from an input pixel grid;

performing low-pass filtering along edge contours of the gradient pixel grid to generate a gradient image output;

finding gradient field peaks along a direction of gradient vectors of the gradient image output to generate thinned gradient pixels;

grouping the thinned gradient pixels into edge segments; and determining whether the edge segments are edge paths or clutter to generate the edge image, wherein a number of iterations of filtering by the polar filter is pre-computed based on an equivalent shift variant linear spatial filter along an ideal noiseless edged to determine an upper bound on SNR improvement.

* * * * *